Sept. 21, 1943.     A. TOWNHILL     2,330,091
VALVE SPRING RETAINER LOCK
Filed June 14, 1940
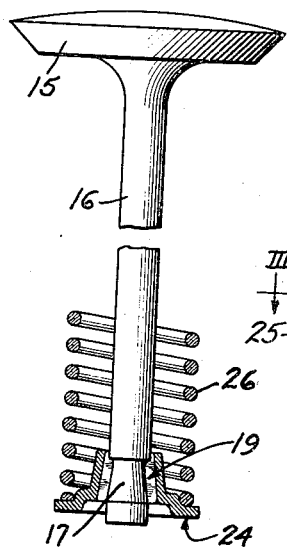
Fig. 1.
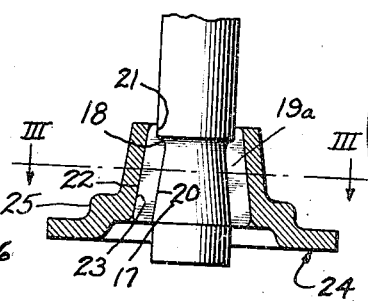
Fig. 2.
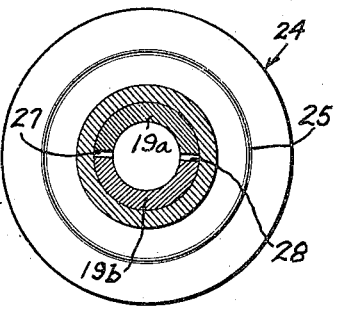
Fig. 3.
Fig. 4.
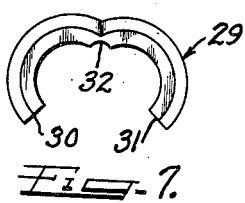
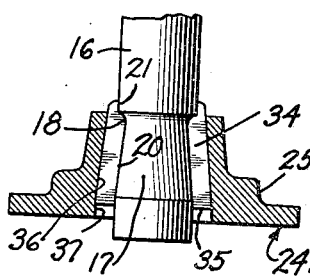
Fig. 6.
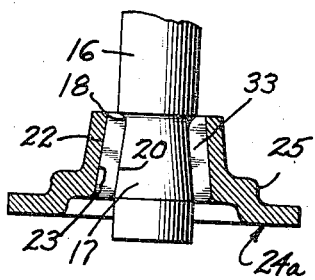
Fig. 5.
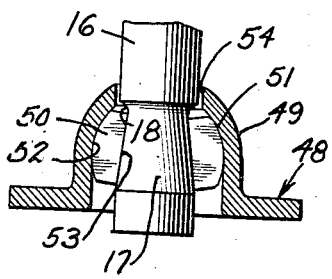
Fig. 7.
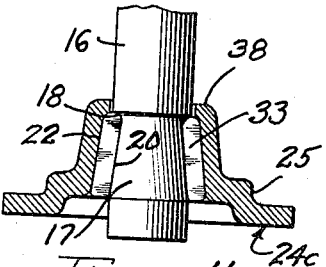
Fig. 8.
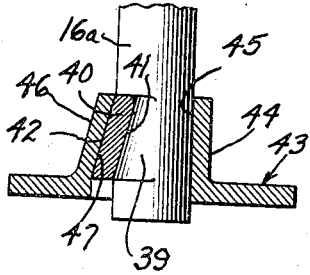
Fig. 9.
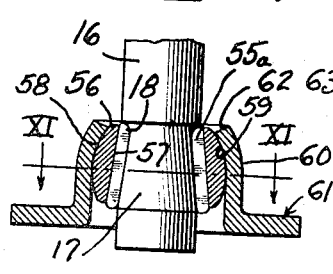
Fig. 10.
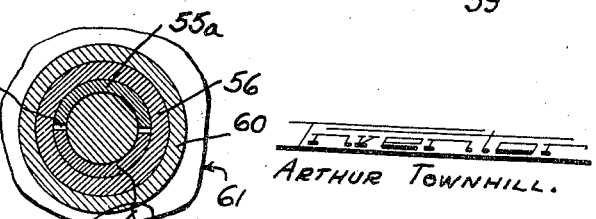
Fig. 11.
Inventor
ARTHUR TOWNHILL.

Patented Sept. 21, 1943

2,330,091

UNITED STATES PATENT OFFICE 2,330,091

VALVE SPRING RETAINER LOCK

Arthur Townhill, Cleveland, Ohio, assignor to Thompson Products Incorporated, Cleveland, Ohio, a corporation of Ohio Application June 14, 1940, Serial No. 340,517

3 Claims. (Cl. 251—144)

This invention relates to valve spring retainer locks or valve stem collars as used on poppet valves in internal combustion engines, and more particularly to tapered locks or collars made of rolled and die-formed or stamped material.

In the usual types of split retainer locks in use at the present time, peripheral beads are provided on the valve stem engaging surfaces which engage within a groove or spaced grooves in the stems of the valves. These valve locks are expensive to manufacture inasmuch as dies, having bead grooves formed therein, are used and experience has demonstrated that great die wear is encountered particularly along the edges of the dies where the beads are subjected to die pressure. Furthermore, the rolling of the metal stock preliminary to the die or stamping operations is expensive, all of which adds to the cost of manufacture.

It is, therefore, an object of the present invention to provide a valve spring retainer lock which may be manufactured at lower than the usual present cost by minimizing die costs.

Another object of this invention is to provide a tapered valve spring retainer lock of substantially uniform thickness along its length.

A further object of this invention is to provide a tapered, uniformly thick valve spring retainer lock having smooth surfaces for engaging a tapered portion on the valve stem whereby stresses are more evenly distributed along its length.

A still further object of this invention is to provide a split one-piece or two-piece valve retainer lock which can be manufactured in quantity lots at less than the usual cost and which can be more easily applied in position on valve stems.

Another and still further object of this invention is to provide a valve spring retainer lock having smooth flat or curved surfaces along its entire valve stem-engaging length which may be manufactured in quantity lots at a minimum of rolling, die or stamping expense.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawing, in which:

Figure 1 is a broken elevational view of a poppet valve assembly having a valve spring and valve spring abutment plate shown in vertical cross section, retained in position thereon by means of a retainer lock formed in accordance with the principles of this invention;

Figure 2 is an enlarged broken elevation view of the lower portion of Figure 1 showing the spring abutment plate in vertical cross section;

Figure 3 is a cross-sectional view taken substantially in the plane indicated by the line III—III of Figure 2;

Figure 4 is a top plan view of a split one-piece retainer lock showing its shape before being bent around the tapered groove provided on the valve stem;

Figure 5 is a view similar to Figure 2 illustrating a modified form of retainer lock;

Figure 6 is a view similar to Figure 2 illustrating a modified form of retainer lock and spring abutment plate;

Figure 7 is a view similar to Figure 2 illustrating a universal joint type of retainer lock embodying the features of the present invention;

Figure 8 is a view similar to Figure 2 showing another modified form of retainer lock and abutment plate;

Figure 9 is a view similar to Figure 2 illustrating a semi-circular retainer lock embodying the principles of this invention;

Figure 10 is a view similar to Figure 7 illustrating another form of universal joint type of retainer lock; and, Figure 11 is a fragmentary cross-sectional view taken substantially in the plane indicated by the line XI—XI of Figure 10.

The valve structure illustrated in Figure 1 comprises a head 15 and a generally cylindrical stem 16. A tapered annular groove 17 is formed in the cylindrical portion of the stem adjacent its free end. It is to be noted that only one of such grooves is provided on the valve stem.

As more clearly shown in Figure 2, the annular groove 17 is tapered inwardly toward the head end of the valve and terminates in a fillet 18.

A retainer lock or locking bush 19 substantially surrounds the valve stem at its grooved portion. As shown in Figure 3, the locking bush 19 comprises two similar parts or halves 19a and 19b which together constitute the split retainer lock. In assembled position, the longitudinal edges of the halves 19a and 19b are slightly spaced apart. One of the half-portions 19a, illustrated in Figure 2, is shown as being substantially uniform in thickness with its inner surface 20 formed conical in shape to complementally engage the surfaces of the tapered groove 17 and the fillet 18. The upper end of the split lock is shaped as at 21 to seat against the smooth cylindrical surface of the stem 16 adjacent the groove fillet 18. The outer surface 22 of the lock is inclined, or conical shaped, to cooperate with an inclined, or conical shaped, opening 23 in the valve spring abutment plate 24.

The abutment plate 24 is provided, outwardly of the central inclined opening 23, with a bulged portion or rib 25 which receives an end of the valve spring 26 to center the spring on the plate and thus maintain it in an operative position.

When the parts are assembled as illustrated in Figure 1, compression of the coil spring 26 serves to maintain the split locking bush 19 in tight gripping engagement of the grooved portion of the valve stem. This tight gripping engagement is assured by the clearance spaces 27 and 28 between the longitudinal edges of the lock halves 19a and 19b, as shown in Figure 3. The locks may be made in two parts or for the sake of ease and convenience in handling and in assembling may be made in one piece, as shown in Figure 4.

The retainer lock 29 (Figure 4) is shaped to the same size and form as the lock 19 with the exception that its longitudinal edges 30 and 31 provide but a single space therebetween when the lock is assembled around the valve stem 16.

After the lock 29 is so shaped, it is opened or bent outwardly as illustrated to space the longitudinal edges 30 and 31 apart sufficiently to be inserted around the valve stem 16. A longitudinally extending groove or score line 32 is provided along the inner surface of the lock 29 diametrically opposite the edges 30 and 31 for the purpose of allowing the lock to be spread and clamped around the valve stem without concentrating the flexing stresses in such a manner as to result in wall deformation or fracture. Alternatively, the lock 29 can initially be formed in the open or outwardly bent condition shown in Figure 4 thereby eliminating the necessity for opening or outwardly bending operation.

The formation of retainer locks having smooth surfaces effects the obvious advantages in manufacture of permitting the stock to be rolled, die-formed or stamped at much less expense than the formation of locks having beads thereon. It has further been found on examination that a retainer lock constructed in a manner as provided herein shows less stress concentration than do locks of the usual or present construction. Furthermore, a better fit results, ease of assembly is facilitated, and there is practically no chance for inaccuracy arising from such construction.

It has been found that the manufacture of a lock as described herein reduces the wear to a considerable extent. This is due to the full surface engagement between the lock and the grooved stem.

Additional modified forms of lock, abutment plate and valve stem constructions are illustrated in Figures 5 to 11.

In Figure 5 the assembly is the same as shown in Figure 2 with the exception that the valve lock half-portion 33, of which there are two, has the same length as the width of the tapered groove 17, and the upper edge of the spring abutment plate 24a is flush with the upper end of the lock 33. If desired, the valve lock 33 may be shaped to taper slightly in thickness in a downward direction. This provision aids the assembly to find its proper position should it vibrate in operation.

As shown in Figure 6, the valve lock half-portion 34, of which there are two, is shaped similarly to the lock 19a with the exception that its lower extremity 35 extends beyond the edge of the tapered groove 17 to embrace the cylindrical surface of the stem adjacent to the groove. The abutment plate 24b has the same general contour as the abutment plate 24a. The wall of the inside conical opening 36 of said plate engages the outer complemental surface of the lock 34 and terminates in a cylindrical bore 37.

Figure 8 illustrates an abutment plate 24c formed similarly to the plate 24a with the exception that it terminates at its upper end in an inwardly extending flange 38. The engagement between the flange 38 and the top portions of the lock 33 tends to still further distribute operating stresses.

Figure 9 illustrates a modified assembly in which the valve stem 16a is provided with a tapered groove 39 extending but half-way around the valve stem. A one-piece semi-circular lock 40 has a wall of uniform thickness along its length in any given plane passing through its axis. Its inner and outer surfaces 41 and 42, respectively, slant in angular relation to its longitudinal axis for complementally engaging the tapered surface of the slot 39 and the inner surface 47 of the retainer plate 43. The lock 40 also tapers circumferentially each way from its thickest central portion.

The valve spring abutment plate 43 has a neck portion 44 that is partly cylindrical, as at 45, for engagement with the smooth portion of the stem 16a and partly conical, as at 46, for complementally engaging the outer surface 42 of the lock 40.

In this modified assembly, the lock 40 restricts relative endwise movement and relative rotative movement between the abutment plate and the valve stem.

Figures 7 and 10 illustrate a modified assembly of a limited universal joint type. In Figure 7, the spring abutment plate 48 is provided with a central semi-hemispherical socket 49 terminating adjacent the cylindrical portion of the inserted valve stem 16 adjacent the fillet 18. A two-piece valve lock of which only the half-portion 50 is illustrated, is inserted between the semi-hemispherical socket 49 and the tapered groove 17. The half-lock 50 is provided with an outer segmental spherical surface 51 complemental in shape to the upper portion of the inner curved surface 52 of the semi-hemispherical socket 49. The inner surface 53 of the lock 50 is shaped to complementally engage the surface of the tapered annular groove 17. The opening 54 at the top of the socket 49 and through which the valve stem 16 is inserted, permits a slight angular movement of the valve relative to the abutment plate. The slight universal joint action in the assembly permits the valve to oscillate sufficiently to find its proper seat under the axial thrust of the spring 26.

Another modified assembly of the limited universal joint type is illustrated in Figures 10 and 11. This assembly permits a much greater oscillation of the valve than in the assembly illustrated in Figure 7. In this form, a two-piece lock having half-portions 55a and 55b are shaped similarly to the valve lock 33 illustrated in Figure 5 and, when assembled as shown in Figure 11, provide spaces 63 between their longitudinal edges. A one-piece bearing or collar 56 is provided with a conical inner surface 57 and a segmental spherical outer surface 58. The inner surface 57 complementally engages the outer surfaces of the lock half-portions 55a and 55b while the curved outer surface 58 complementally engages an inner curved surface 59 provided in the socket portion 60 of the abutment plate 61. At its upper end, the socket 60 terminates in an enlarged opening 62 whose edges are in relatively widely spaced relation from the cylindrical surface of the stem 16.

This assembly permits a greater range of oscillation of the valve than in the assembly illustrated in Figure 7 by reason of the more widely spaced relation between the edges of the opening 62 and the cylindrical surfaces of the valve stem 16. In all other respects, the assemblies illustrated in Figures 7, 10 and 11 operate in the same manner as illustrated in Figures 1 and 2 described previously herein.

The assemblies illustrated in Figures 2, 3 and 5 are the preferred forms of the present invention.

Figures 1 to 3 and 5 through 11 illustrate the case of a two-piece lock. It is to be understood, however, that a one-piece lock shaped in the manner as illustrated in Figure 4 may also be used in these assemblies.

From the foregoing description it will be observed that a valve, retainer lock and spring abutment plate assembly has been provided which is more positive in operation, of longer life, and of cheaper construction than the usual or presently used assemblies of a similar type. This is accomplished by the use of wide smooth surfaces instead of the narrow beads or grooves of the usual retainer lock elements.

While particular embodiments of this invention have been illustrated, it will, of course, be understood that the invention should not be limited thereto, since many modifications may be made, and, therefore, it is contemplated by the appended claims to cover all such modifications as fall within the true spirit and scope of the present invention.

I claim as my invention:

1. A valve spring retainer lock for a valve assembly comprising a split member having a smooth conical outer surface along its entire length, an intermediate smooth conical inner surface concentric with said outer surface, and a cylindrical inner surface at each end of said lock adjacent said intermediate conical inner surface, one of said cylindrical inner surfaces and said conical inner surface being joined by a curved surface and the other of said cylindrical inner surfaces and said conical inner surface being joined at a line edge.

2. A valve spring retainer lock for a valve assembly comprising a split member having smooth inner and outer conical surfaces in concentric equi-spaced relation, said inner conical surface extending along an intermediate portion of the member, and a cylindrical inner surface at each end of said member, one of said cylindrical inner surfaces and said conical inner surface being joined by a curved surface and the other of said cylindrical inner surfaces and said conical inner surface being joined at a line edge.

3. In a valve assembly including a valve having a smooth stem of substantially uniform diameter along its length with an annular groove adjacent its free end and tapered away from said end, said groove being joined at one end thereof with the smooth surface of said stem by a line edge and being joined at its other end with the smooth surface of said stem by a fillet, and a valve spring abutment plate disposed about said grooved stem portion and having a flared inner surface concentric with and parallel to the tapered groove on said stem, the combination of a valve spring retainer lock interposed between said valve stem and said abutment plate comprising a split member having an inner surface complemental to said valve stem along the portion thereof including the annular groove and the stem surfaces adjacent both ends of the groove and an outer conical surface for seating along the tapered inner surface of said abutment plate.

ARTHUR TOWNHILL.